United States Patent Office 3,503,972
Patented Mar. 31, 1970

3,503,972
ALKYL N-AMIDINO (OR GUANIDINO)-
PYRAZINIMIDATES
Peter I. Pollak, Scotch Plains, and Roger J. Tull,
Metuchen, N.J., assignors to Merck & Co., Inc., Rahway, N.J., a corporation of New Jersey
No Drawing. Continuation of application Ser. No. 574,921, Aug. 25, 1966. This application Nov. 4, 1968, Ser. No. 774,586
Int. Cl. C07d 51/66
U.S. Cl. 260—250
12 Claims

ABSTRACT OF THE DISCLOSURE

A process is described for the preparation of 3-amino-5-amino (or substituted amino)-6-halopyrazinoylguanidines and corresponding pyrazinamidoguanidines which comprises amidation of an alkyl pyrazinoate, dehydration to the pyrazinonitrile, alcoholysis to the alkyl pyrazinimidate, further alcoholysis to the ortho ester, conversion to the alkyl N-amidino- or N-guanidinopyrazinimidate by treatment with guanidine or aminoguanidine, respectively, and finally hydrolysis to the pyrazinoylguanidine or pyrazinamidoguanidine. The final products are effectvie diuretics and natriuretics. The intermediate alkyl pyrazinimidates, ortho esters and alkyl N-amidino and N-guanidinopyrazinimidates are new compounds.

---

This application is a continuation of our copending U.S. Ser. No. 574,921, filed Aug. 25, 1966, and now abondoned.

This invention is concerned with novel compounds useful in the preparation of (3,5-diamino-6-halopyrazinoyl)guanidine and (3,5-diamino-6-halopyrazinamido)guanidine compounds which possess useful diuretic properties but more importantly they selectively enhance the excretion of sodium and chloride ions while suppressing the excretion of potassium. The products prepared from the novel compounds of this invention are especially useful in the treatment or management of edema and other abnormalities resulting from the retention of excess quantities of sodium and/or fluid by the animal organism.

The novel alkyl esters of N-amidino-3,5-diamino-6-halopyrazinimidate or alkyl esters of N-guanidino-3,5-diamino-6-halopyrazinimidate are hydrolyzed to give the pharmacologically active pyrazinoylguanidine or pyrazinamidoguanidine. Hydrolysis advantageously is effected with a 1 to 6 normal mineral acid particularly hydrochloric, hydrobromic, sulfuric acid and the like, but excluding nitric acid. The volume of acid used should be the minimum amount necessary to dissolve the starting material at reflux temperature. The desired pyrazinoylguanidine or pyrazinamidoguanidine product formed generally crystallizes from solution and can be collected by conventional methods. The product is obtained as a salt of the acid used for the hydrolysis and the free base can be reconstituted if desired.

The preferred compounds made from the novel compounds of this invention are represented by structure II of the following scheme that illustrates the process for preparing the pharmacologically active compounds:

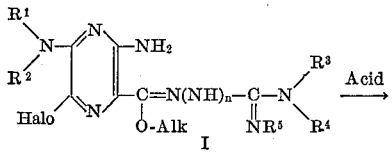

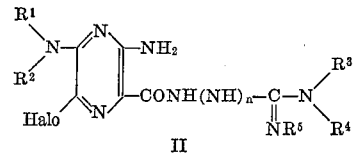

The alkyl N-amidino (or guanidino)-3,5-diamino-6-halopyrazinimidates, structure I above, are themselves new compounds. These products, I, are prepared by a series of reactions from known alkyl 3,5-diamino-6-halopyrazinoates (III). The preparation of the needed intermediate I is illustrated by the following reaction schemes (a) through (e):

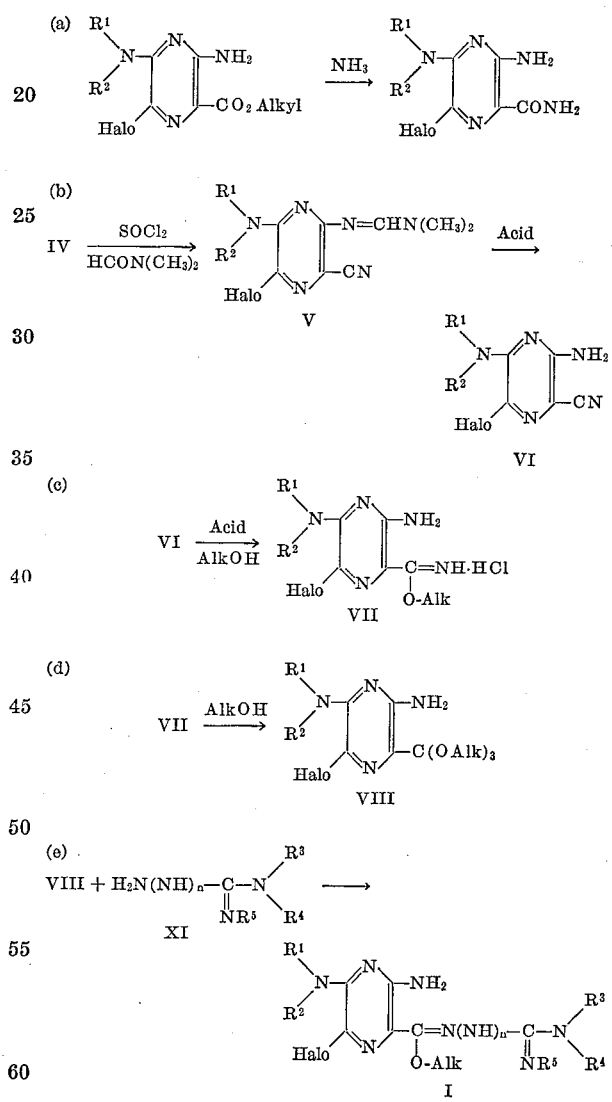

(a) The 3,5-diamino-6-halopyrazinamide (IV) intermediates advantageously are prepared by the reaction of the appropriate alkyl 3,5-diamino-6-halopyrazinoate (III) with ammonia. Reaction can be conducted using liquid ammonia at temperatures slightly below or slightly above ambient temperature or, the ester III can be dissolved in an inert solvent and ammonia gas admitted below the surface of the solution.

(b) The 3,5-diamino-6-halopyrazinamides (IV) upon treatment with either phosphoryl chloride or thionyl chloride in the presence of dimethylformamide, advantageously with warming, form the corresponding N,N-dimethyl-N'-(3-cyano-5-halo-6-amino-2-pyrazinyl)formamidines (V) which can be hydrolyzed in the presence of a strong mineral or organic acid (such as hydrochloric, sulfuric, methanesulfonic and the like acids) to produce the 3,5-diamino-6-halopyrazinonitriles (VI).

It is to be recognized that if $R^1$ and $R^2$ in the starting amide IV are each hydrogen, in the intermediate (V) the 5-position amino group will be $-N=CHN(CH_3)_2$, but in the product VI the 5-position group will be reconstituted to the free amino group since hydrolysis will involve both the 3- and the 5-substituents.

(c) The pyrazinonitriles (VI) upon reaction with a lower alkanol, advantageously one having from 1 to 3 carbon atoms, under anhydrous conditions and in the presence of hydrogen chloride or hydrogen bromide gas, is converted to the acid salt of alkyl 3,5-diamino-6-halopyrazinimidate (VII). The pyrazinimidate generally crystallizes from the reaction mixture and can be separated therefrom by known methods. The reaction preferably is carried out in the presence of a solvent advantageously absolute ether, normal dibutyl ether, or other anhydrous ethers or dioxane, dimethylformamide, dimethylsulfoxide and the like, and preferably at reduced temperatures such as at 0° C. although temperatures up to about 60° C. could be employed. The reaction is continued for from 6 hours to several days or until a sufficient yield of crystalline material is obtained. If desired, the pyrazinimidate can be employed in the next step (d) directly or it can be dried in a desiccator over any dehydrating agent capable of absorbing hydrogen chloride and hydrogen bromide gas and then used in the following reaction.

(d) Upon refluxing the pyrazinimidate VII with an alkanol having from 1 to 3 carbons, and preferably the same alkanol used in step (c) under anhydrous conditions and in the presence of a solvent of the type employed in step (c), a precipitate of the trialkyl 3,5-diamino-6-halo-orthopyrazinoate VIII is obtained that can be used directly in step (e) or can be dried in the manner described above for the end product of step (c). From about 2 to 10 moles of the alkanol is employed in this reaction and approximately 5 volumes of solvent is employed with respect to the volume of alkanol used. The reaction can, however, be carried out without a solvent in which case the reaction mixture preferably is heated at about 40 to 60° C. and the solvent is added after the reaction is completed in order to precipitate any undesirable by-products.

It will be evident from the above discussion that steps (c) and (d) can be combined into one step by adding an additional amount of alkanol after the first phase of the reaction has taken place.

(e) The trialkyl 3,5-diamino-6-halo-orthopyrazinoate (VIII) then is reacted with a guanidine or an aminoguanidine (IX) in the presence of a lower alkanoic acid anhydride, preferably one having from 2 to 4 carbon atoms, and advantageously with heating to the boiling point of the anhydride employed in the reaction mixture. Heating of the reaction mixture is continued for about an hour while distilling off the acid and alkyl ester of the acid formed as by-products and the residue obtained represents the alkyl N-amidino(or guanidino)-3,5-diamino-6-halopyrazinimidate I intermediate which is employed in the novel process of this invention. The residue can be used directly in the hydrolysis to form the pyrazinoylguanidine or pyrazinamidoguanidine product II or the residue can be dried and recrystallized to obtain the purified product I. The guanidine or aminoguanidine reactants (IX) are readily available compounds or can be prepared by methods described in the literature. The free base is preferred in the reaction, and advantageously can be prepared from a salt of the guanidine or aminoguanidine by known methods.

Another method by which product I (when $n=0$) can be prepared involves the following reaction scheme:

Product VII ⟶

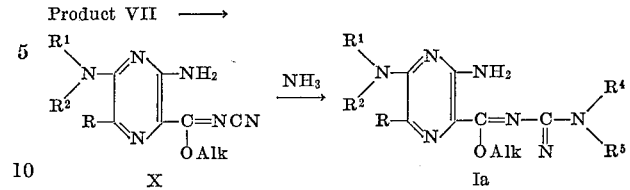

Treatment of the alkyl 3,5-diamino-6-halopyrazinimidate (VII) with an anhydrous alcoholic solution of cyanamide or preferably cyanogenhalide as the chloride or bromide while slowly adding a base such as an alkali metal lower alkoxide, advantageously sodium or potassium methoxide or ethoxide gives alkyl N-cyano-3,5-diamino-6-halopyrazinimidate (X). The reaction preferably is carried out in ethanol with heating, preferably to reflux, followed by evaporation of the solvent which results in the formation of a residue which is product X. Treatment of X with ammonia or an amine of the structure $HNR^4R^5$ gives product Ia.

In each of the structures I through IX used to illustrate the products employed in the above reaction sequences the variable radicals have the following meaning: halo is halogen, particularly chloro or bromo; $R^1$ and $R^2$ can be the same or dissimilar groups selected from hydrogen lower alkyl advantageously having from 1 to 5 carbon atoms as methyl, ethyl, propyl, isopropyl, butyl, amyl, or any of the branched 4 or 5 carbon alkyl groups, lower alkenyl advantageously having from 3 to 5 carbon atoms and particularly the allyl, propargyl or 3-pentenyl and the like, or a lower(cycloalkyl-alkyl) group advantageously having from 4 to 8 carbons in the group such as the cyclopropylmethyl, cyclopentylmethyl, cyclohexylmethyl, cyclohexylethyl, cyclopropylethyl and the like; $R^3$ represents hydrogen, a lower alkyl advantageously having from 1 to 5 carbon atoms, such as methyl, ethyl, propyl, isopropyl, butyl, amyl, or any of the branched 4 or 5 carbon lower alkyl groups, or substituted lower alkyl groups having from 1 to 5 carbon atoms and particularly those containing hydroxy or a heterocycli substituent such as the pyridyl substituent or a phenyl substituent, the phenyl lower alkyl advantageously having an alkyl moiety of 1 to 2 carbon atoms and the phenyl moiety being either unsubstituted or substituted with 1 or more halogen (preferably chlorine, bromine, fluorine), lower alkyl (having 1 to 2 carbon atoms) and lower alkoxy (having 1 to 2 carbon atoms) groups; $R^4$ advantageously is hydrogen, lower alkyl having 1 to 5 carbon atoms such as methyl, ethyl, propyl, isopropyl, butyl, amyl or any of the branched 4 or 5 carbon alkyl groups, phenyl-lower alkyl wherein the alkyl moiety advantageously has from 1 to 2 carbon atoms and the phenyl moiety being either unsubstituted or having one or more substituents selected preferably from halogen (advantageously chlorine, bromine, fluorine), lower alkyl (advantageously having from 1 to 2 carbon atoms), and lower alkoxy (having 1 to 2 carbon atoms) groups; when $R^3$ and $R^4$ are each lower alkyl they can be linked together to form a cyclic structure with the nitrogen atom to which they are attached, thereby forming a group having the structure

wherein x preferably is one of the numerals from 4 through 7, thus yielding, for example, the 1-pyrrolidinyl group; $R^5$ advantageously is hydrogen or lower alkyl having from 1 to 5 carbon atoms such as methyl, ethyl, propyl, isopropyl, butyl, amyl or any of the branched 4 to 5 carbon alkyl groups; and when $R^5$ and $R^4$ each are lower alkyl, they can be linked together to form the structure

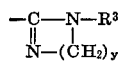

wherein $y$ preferably is one of the numerals 2 or 3; and $n$ is either 0 or 1 and when $n$ is 1 then $R^5$ is hydrogen.

EXAMPLE 1

(3,5-diamino - 6 - chloropyrazinoyl)guanidine hydrochloride

*Step A.*—Preparation of 3,5-diamino - 6 - chloropyrazinamide: Methyl 3,5-diamino - 6 - chloropyrazinoate (0.1 mole) is added to liquid ammonia (200 ml.) in a stainless steel autoclave and the reaction mixture is heated at 100° C. for 12 hours. The ammonia is expelled and the product is removed from the autoclave and recrystallized from methanol to give a 90% yield of 3,5-diamino-6-chloropyrazinamide, melting point 218.5–220.5° C.

*Step B.*—Preparation of 3,5-diamino - 6 - chloropyrazinonitrile: To a stirred suspension of 3,5-diamino-6-chloropyrazinamide (0.0115 mole) in dimethylformamide (20 ml.) is added phosphoryl chloride (2.0 ml. excess) in one portion. The reaction temperature rises to 80° C. and is maintained at this temperature for 10 minutes by application of external heat. The solvent then is removed in vacuo and the residue is added to boiling water (50 ml.). In a few minutes a yellow crystalline solid separates, the solution is cooled and the product recovered by filtration to give a 77% yield of 3,5-diamino-6-chloropyrazinonitrile which after recrystallization from water melts at 295° C.

*Step C.*—Preparation of ethyl 3,5-diamino - 6 - chloropyrazinimidate hydrochloride: Hydrogen chloride gas (1.1 mole) is passed into a solution of 1 mole of 3,5-diamino-6-chloropyrazinonitrile in 1.1 mole of absolute ethanol and 500 ml. of absolute ether at 0° C. The solution, protected from water, is stored at 0° C. for four days. The ethyl 3,5-diamino - 6 - chloropyrazinimidate hydrochloride that crystallizes is collected and freed from excess hydrogen chloride in a vacuum desiccator over calcium oxide and potassium carbonate.

*Step D.*—Preparation of triethyl 3,5-diamino-6-chloro-orthopyrazinoate: Ethyl 3,5-diamino - 6 - chloropyrazinimidate (1 mole) is suspended in a solution of 5 moles of absolute ethanol and 1 liter of ether and refluxed for 24 hours. The reaction mixture then is filtered and the filtrate concentrated to dryness yielding triethyl 3,5-diamino-6-chloro-orthopyrazinoate which is used directly in the next step.

*Step E.*—Preparation of ethyl N-amidino-3,5-diamino-6-chloropyrazinimidate: One mole of triethyl 3,5-diamino-6-chloro orthopyrazinoate and 1 mole of guanidine are heated together in 2 moles of acetic anhydride at 140° C. for 1 hour while distilling off the acetic acid and alkyl acetate by-products. The residue, ethyl N-amidino-3,5-diamino - 6 - chloropyrazinimidate, is used directly in the next step without further purification.

*Step F.*— Preparation of (3,5-diamino - 6 - chloropyrazinoyl)guanidine: Ethyl N-amidino-3,5-diamino-6-chloropyrazinimidate is refluxed with 500 ml. of 2 N hydrochloric acid for 5 hours. On cooling (3,5-diamino-6-chloropyrazinoyl)guanidine hydrochloride crystallizes from solution and is collected by filtration and dried, M.P. 293.5° C. (dec.).

EXAMPLE 2

(3,5-diamino-6-bromopyrazinoyl)guanidine

By replacing the methyl 3,5-diamino - 6 - chloropyrazinoate employed in Example 1, Step A, by an equimolecular quantity of methyl 3,5-diamino - 6 - bromopyrazinoate and following substantially the same procedure described in Example 1, Steps A through F, there is obtained (3,4-diamino - 6 - bromopyrazinoyl)guanidine hydrochloride which in the form of its free base melts at 232.5–235.5° C.

Other (3,5-diamino - 6 - chloropyrazinoyl)guanidine compounds prepared by the process of this invention are described in the following table. The products are prepared following substantially the same process described in Example 1, except the methyl 3,5-diamino-6-chloropyrazinoate employed in Example 1, Step A, is replaced by the appropriate ester III having the substituents $R^1$ and $R^2$ defined in the following table. It is to be understood, of course, that where the definition of the substitutents $R^1$ and $R^2$ indicate that the same ester as employed in Example 1, Step A, is required, then no change is made in this reactant. Similarly, the guanidine reactant IX having the substituents identified for the variables $R^3$, $R^4$ and $R^5$ identified in the following table is used in place of the guanidine reactant employed in Example 1, Step E. All other reagents and reaction conditions for the preparation of the products are as described in Example 1, Steps A through F, although the modifications hereinabove described can be made in the various steps to ultimately give the desired (3,5-diamino-6-chloropyrazinoyl)guanidine having the structure II as defined in the following table.

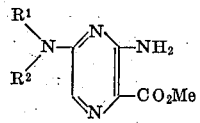    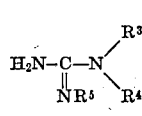    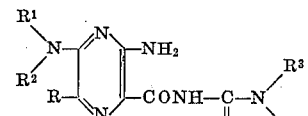

III    IX    II

| R | $R^1$ | $R^2$ | $R^3$ | $R^4$ | $R^5$ | M.P., ° C. (d.) of End Product* |
|---|---|---|---|---|---|---|
| Cl | H | H | $CH_3$ | H | H | 252–254. |
| Cl | H | H | $CH_3$ | $CH_3$ | H | HCl monohydrate, 277. |
| Cl | H | H | $C_2H_5$ | $C_2H_5$ | H | 265. |
| Cl | H | H | $CH_3$ | —CH$_2$—⌬ | H | HCl, 274.5. |
| Cl | H | H | —$CH_2CH_2OH$ | H | H | HCl, 228.5–229.5. |
| Cl | H | H | —CH$_2$—⌬ | H | H | 215–216. |
| Cl | H | H | —CH$_2$—⌬-Cl | H | H | 220–223. |
| Cl | H | H | —CH$_2$—⌬-F | H | H | 216–219.5. |

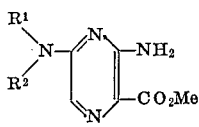 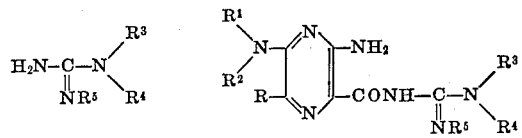

| | III | | | IX | | | |
|---|---|---|---|---|---|---|---|
| | | | | | | | II |
| R | R¹ | R² | R³ | R⁴ | R⁵ | | M.P., °C. (d.) of End Product * |

| R | R¹ | R² | R³ | R⁴ | R⁵ | M.P., °C. (d.) of End Product * |
|---|---|---|---|---|---|---|
| Cl | H | H | —CH₂—C₆H₄—CH₃ | H | H | 210–212; |
| Cl | H | H | —CH₂—C₆H₄—OCH₃ | H | H | 175.5–179.5; |
| Cl | H | H | —CH₂—C₆H₃(CH₃)—CH₃ | H | H | 220–222; |
| Cl | H | H | —CH(CH₃)—C₆H₅ | H | H | 152–160; |
| Cl | H | H | —CH₂CH₂—C₆H₅ | H | H | 219–221.5; |
| Cl | H | H | —CH₂—C₆H₅ | H | H | 2 HCl, 280.5–283.5. |
| Cl | H | H | H | ⌐CH₂CH₂⌐ | | 222.5–223.5; |
| Cl | H | —iPr | CH₃ | H | H | >300. |
| Cl | H | —iPr | CH₃ | CH₃ | H | 238.5–240. |
| Cl | H | —iPr | —CH₂CH₂OH | H | H | HCl·hemihydrate, 185–186. |
| Cl | H | —iPr | CH₂—C₆H₅ | H | H | 200.5–204.5. |
| Cl | H | —CH₂CH=CH₂ | H | H | H | 213–214. |
| Cl | H | —CH₂CH=CH₂ | CH₃ | CH₃ | H | 213–215. |
| Cl | H | nBu | CH₃ | CH₃ | H | 187.5. |
| Cl | H | CH₂-cyclopropyl | H | H | H | 220–221.5; |
| Cl | CH₃ | CH₃ | H | H | H | 216–217. |
| Cl | CH₃ | C₂H₅ | H | H | H | 229–230. |
| Cl | CH₃ | nPr | H | H | H | 214–215. |
| Cl | CH₃ | —iPr | H | H | H | 207–208. |
| Cl | CH₃ | —iPr | CH₃ | CH₃ | H | 209–211. |
| Cl | Et | Et | CH₃ | CH₃ | H | 212–214. |

*As free base unless otherwise noted.

EXAMPLE 3

(3,5-diamino-6-chloropyrazinamido)guanidine

By replacing the guanidine employed in Example 1, Step E, by an equimolecular quantity of aminoguanidine and then following substantially the same procedure described in Step E of Example 1, there is obtained ethyl N-guanidino-3,5-diamino-6-chloropyrazinimidate. This product then is refluxed with 500 ml. of 1 N sulfuric acid for about five hours. On cooling (3,5-diamino-6-chloropyrazinamido)guanidine hydrochloride crystallizes from solution and is collection by filtration and dried. The product melts at 281–282° C. (dec.).

EXAMPLE 4

(3-amino-5-dimethylamino-6-chloropyrazinamido) guanidine

This product is prepared following substantially the same procedure described in Example 1, Steps E and F, but using triethyl 3-amino-5-dimethylamino-6-chloropyrazinoate and aminoguanidine in place of the pyrazinoate and guanidine employed in Step E of Example 1. The product obtained, in the form of its free base, melts at 221° C. (dec.).

EXAMPLE 5

1-(3,5-diamino-6-chloropyrazinamido)-3,3-dimethylguanidine hydrochloride

The above product is prepared following substantially the same procedure described in Example 3 except the aminoguanidine reactant employed in Example 3 is replaced by an equimolecular quantity of 1-amino-3,3-dimethylguanidine. The product obtained as the hydrochloride melts at 279–280° C. (dec.).

By replacing the methyl 3,5-diamino-6-chloropyrazinoate employed in Step A of Example 1 by the methyl 3-amino-5-NR¹R²-6-chloropyrazinoates (III) identified in Table 1 and then following substantially the same procedure described in Example 1, Steps A–D, there are obtained the corresponding triethyl 3-amino-5-NR¹R²-6-chloro-orthopyrazinoates.

By reacting the orthopyrazinoates thus obtained with aminoguanidine by substantially the same procedure described in Example 1, Step E, and then hydrolyzing the product thus obtained by the method described in Step F of Example 1 there are produced the corresponding (3-amino-5-NR¹R²-6-chloropyrazinamido)guanidines having the R¹ and R² substituents identified in Table I.

Similarly, by replacing the guanidine reactant employed in Example 2 by an equimolecular quantity of aminoguanidine and then following substantially the same procedures described in Example 2, there is obtained (3,5-diamino-6-bromopyrazinamido)guanidine.

In like manner, by replacing the aminoguanidine employed in Example 3 by an equimolecular quantity of:

1-amino-3-methylguanidine,
1-amino-3-(2-hydroxyethyl)guanidine,
1-amino-3-phenethylguanidine,
1-amino-3-benzylguanidine,
1-amino-2,3-ethyleneguanidine, and
1-amino-3,3-dimethylguanidine, and then following substantially the same procedures described in Example 3 there is obtained, respectively, 1-(3,5-diamino-6-chloropyrazinamido)-3-methylguanidine,
1-(3,5-diamino-6-chloropyrazinamido)-3-(2-hydroxyethyl)-guanidine,
1-(3,5-diamino-6-chloropyrazinamido)-3-phenethylguanidine,
1-(3,5-diamino-6-chloropyrazinamido)-3-benzylguanidine,
1-(3,5-diamino-6-chloropyrazinamido)-2,3-ethyleneguanidine, and
1-(3,5-diamino-6-chloropyrazinamido)-3,3-dimethylguanidine.

What is claimed is:

1. An alkyl N-amidino(or guanidino)pyrazinimidate having the structure

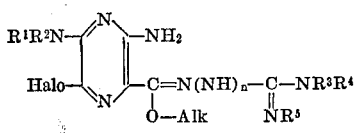

wherein halo is selected from the group consisting of chlorine and bromine, $R^1$ is selected from the group consisting of hydrogen, lower alkyl, lower alkenyl and lower-(cycloalkylalkyl); $R^2$ is selected from the group consisting of hydrogen, lower alkyl, lower alkenyl, and lower-(cycloalkylalkyl); $R^3$ is selected from the group consisting of hydrogen, lower alkyl, hydroxy-lower alkyl, phenyl-lower alkyl, (halophenyl)lower alkyl, (lower alkylphenyl)-lower alkyl, (lower alkoxyphenyl)-lower alkyl, and pyridyl-lower alkyl; $R^4$ is selected from the group consisting of hydrogen, lower alkyl, and phenyl-lower alkyl; $R^5$ is selected from the group consisting of hydrogen and lower alkyl; and when $R^4$ and $R^5$ each are lower alkyl, they can be linked together to form the cyclic structure

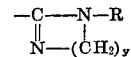

wherein $y$ is one of the numerals 2 and 3; and $n$ is a numeral selected from 0 and 1; and Alk is lower alkyl.

2. A compound as claimed in claim 1 wherein $n$ is zero.

3. A compound as claimed in claim 1 wherein $n$ is zero, and each of the variables $R^3$, $R^4$ and $R^5$ represents hydrogen.

4. A compound as claimed in claim 1 whertin $n$ is zero; $R^1$, $R^3$, $R^4$ and $R^5$ each represents hydrogen; and $R^2$ represents lower alkyl.

5. A compound as claimed in claim 1 wherein $n$ is zero; $R^1$ and $R^2$ each represents lower alkyl; and $R^3$, $R^4$ and $R^5$ each represents hydrogen.

6. Lower alkyl N-amidino-3-amino-5-dimethylamino-6-chloropyrazinimidate.

7. A compound as claimed in claim 1 wherein $n$ is zero; and $R^1$, $R^2$, $R^3$, $R^4$ and $R^5$ each represents hydrogen.

8. Lower alkyl N-amidino - 3,5 - diamino-6-chloropyrazinimidate.

9. A compound as claimed in claim 1 wherein $n$ represents the numeral, one.

10. A compound as claimed in claim 1 wherein $n$ represents the numeral, one; and each of the variables $R^3$, $R^4$ and $R^5$ represents hydrogen.

11. A compound as claimed in claim 1 wherein $n$ represents the numeral, one; and each of the variables $R^1$, $R^2$, $R^3$, $R^4$ and $R^5$ represents hydrogen.

12. Lower alkyl N - guandino-3,5-diamino - 6-chloropyrazinimidate.

References Cited

Rogers et al.: Chem. Rev., vol. 61, No. 2, pp. 185–6, April 1966.

Whitehead et al.: J. Am. Chem. Soc. 77, 5872–4 (1955).

ALEX MAZEL, Primary Examiner

R. V. RUSH, Assistant Examiner